United States Patent
Bühle et al.

(10) Patent No.: US 10,717,426 B2
(45) Date of Patent: Jul. 21, 2020

(54) METHOD TO CONTROL A VEHICLE DRIVETRAIN, AND DRIVETRAIN-MODULE FOR SUCH A VEHICLE

(71) Applicant: ZF Friedrichshafen AG, Friedrichshafen (DE)

(72) Inventors: Felix Bühle, Eriskirch (DE); Thomas Lemp, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 139 days.

(21) Appl. No.: 16/116,168

(22) Filed: Aug. 29, 2018

(65) Prior Publication Data

US 2019/0061733 A1 Feb. 28, 2019

(30) Foreign Application Priority Data

Aug. 30, 2017 (DE) .......................... 10 2017 215 172

(51) Int. Cl.
*B60W 10/02* (2006.01)
*B60W 10/10* (2012.01)
(Continued)

(52) U.S. Cl.
CPC .............. *B60W 20/00* (2013.01); *B60K 6/36* (2013.01); *B60K 6/387* (2013.01); *B60K 6/40* (2013.01);
(Continued)

(58) Field of Classification Search
CPC .... B60W 10/02; B60W 10/10; B60W 30/181; B60W 2510/0208; B60W 2520/04;
(Continued)

(56) References Cited

U.S. PATENT DOCUMENTS 4,829,433 A * 5/1989 Nakano ............. F16H 61/66259
192/221
6,183,389 B1 2/2001 Tabata
(Continued)

FOREIGN PATENT DOCUMENTS

DE 19953587 A1 5/2000
DE 112009002281 T5 7/2011
(Continued)

OTHER PUBLICATIONS

German Search Report DE102017215172.2 dated Jan. 25, 2018. (12 pages).

*Primary Examiner* — Edwin A Young
(74) *Attorney, Agent, or Firm* — Dority & Manning, P.A.

(57) ABSTRACT

A method for operating a drive train of a motor vehicle includes selecting between first and second operating strategies for controlling a starting component (3A, 3B) during a stopping process of the motor vehicle, and carrying out a downshift of the transmission (G) during the stopping process after implementing the first operating strategy or the second operating strategy. In the first operating strategy, the starting component (3A, 3B) is engaged or locked up and/or remains engaged or locked up at least until the motor vehicle comes to a standstill. In the second operating strategy, the starting component (3A, 3B) is disengaged or the lock-up of the starting component (3A, 36) is released before the motor vehicle come to the standstill. The downshift of the transmission (G) is triggered at a different rotational speed limit value upon implementation of the first operating strategy than upon implementation of the second operating strategy.

10 Claims, 2 Drawing Sheets

(51) Int. Cl.
*B60W 20/00* (2016.01)
*F16H 61/02* (2006.01)
*F16H 63/46* (2006.01)
*B60K 6/36* (2007.10)
*B60K 6/387* (2007.10)
*B60K 6/40* (2007.10)
*B60K 6/48* (2007.10)
*B60K 6/547* (2007.10)
*F16H 45/02* (2006.01)
*F16H 61/14* (2006.01)

(52) U.S. Cl.
CPC ............... *B60K 6/48* (2013.01); *B60K 6/547* (2013.01); *F16H 45/02* (2013.01); *F16H 61/0213* (2013.01); *F16H 61/143* (2013.01); *F16H 63/46* (2013.01); *B60Y 2200/92* (2013.01); *F16H 2061/0227* (2013.01); *F16H 2312/16* (2013.01)

(58) Field of Classification Search
CPC ........ B60W 2710/1005; F16H 61/0213; F16H 2306/20; F16H 2312/16
See application file for complete search history.

(56) References Cited

U.S. PATENT DOCUMENTS

| | | | |
|---|---|---|---|
| 8,108,115 | B2 | 1/2012 | Kobayashi et al. |
| 8,352,137 | B2 | 1/2013 | Inagaki et al. |
| 8,935,062 | B2 | 1/2015 | Inagaki et al. |
| 2003/0186778 | A1 | 10/2003 | Yamamoto et al. |
| 2013/0228027 | A1* | 9/2013 | Ikeya ............... F16H 63/502 74/331 |
| 2016/0039421 | A1* | 2/2016 | Kaneta ............ B60W 30/18118 477/73 |

FOREIGN PATENT DOCUMENTS

DE 112011100259 T5 11/2012
DE 112008001375 B4 6/2014

* cited by examiner

METHOD TO CONTROL A VEHICLE DRIVETRAIN, AND DRIVETRAIN-MODULE FOR SUCH A VEHICLE

FIELD OF THE INVENTION

The invention relates generally to a method for operating a drive train of a motor vehicle, and to a drive train module of such a motor vehicle.

BACKGROUND

The drive train of a conventional motor vehicle having an internal combustion engine as the sole drive source usually includes a starting component in the power flow between the drive source and the driving wheels in order to enable a starting process of the motor vehicle. Examples of such a starting component are hydrodynamic torque converters or friction clutches. The drive train of a motor vehicle including an electric motor as the sole drive source generally does not require a starting component, since the electric motor can accelerate the vehicle from a standstill.

When such a motor vehicle is stopped, the starting component is usually disengaged or its lock-up is released. Patent application DE 10 2006 042 608 A1 teaches, in this regard, a method for determining the condition of such a launch clutch. According thereto, the torque flow of the drive is observed during the stopping process of a vehicle including a hybrid drive. If it is established that the launch clutch erroneously could not be disengaged during stopping, a subsequent engine start is not fully permitted, for safety reasons.

In contrast, the still unpublished patent application DE 10 2016 206 730.3 teaches a method in which, during a stopping process of a motor vehicle, the starting component is engaged or locked up, provided it has not already been engaged or locked up, and remains engaged or locked up at least until the motor vehicle has come to a standstill. Due to such a stopping process, a starting process subsequent thereto can take place without a time delay, with the starting component engaged or locked up.

SUMMARY OF THE INVENTION

Example aspects of the present invention provide a method for operating a drive train, which is optimized for a stopping process with the starting component engaged or locked up, as well as for a stopping process in which the starting component is disengaged or a lock-up of the starting component has been released.

The method is suitable for operating a motor vehicle drive train which includes at least one drive source designed as an electric motor or machine, a transmission for providing different transmission ratios between an input shaft and an output shaft of the transmission, and a starting component in the power flow between the drive source and the output shaft. The electric machine can act either as the sole drive source in the drive train or can interact with an internal combustion engine in a hybrid drive train. The starting component can be arranged outside or inside the transmission.

In a stopping process of the motor vehicle, a selection is made between a first and a second operating strategy for controlling the starting component or a lock-up of the starting component. In the first operating strategy, the starting component is engaged or locked up, provided it has not already been engaged or locked up. In the first operating strategy, the starting component remains engaged or locked up, at least until the motor vehicle has come to a standstill. In the second operating strategy, the starting component is disengaged or the lock-up of the starting component is released during the stopping process before the motor vehicle has come to a standstill.

According to the invention, it is provided to trigger a downshift of the transmission, which is to be carried out during the stopping process, at another rotational speed limit value upon the implementation of the first operating strategy than is the case upon implementation of the second operating strategy. In other words, reaching or falling below a reference speed is a condition for carrying out the downshift. This reference speed assumes different values depending on whether the first operating strategy or the second operating strategy is being implemented during the stopping process. The reference speed, i.e., the rotational speed limit value, is based on the rotational speed of at least one transmission shaft in this case, for example, the input shaft or the output shaft.

Due to the different rotational speed limit value depending on the implemented operating strategy, a downshift can be preferred upon implementation of the first operating strategy, for example, which requires that the starting component be non-engaged or non-locked-up in order to ensure a high level of shifting comfort, so that the starting component can be engaged or locked up in a timely manner subsequent to the downshift.

Preferably, the downshift is carried out at a higher rotational speed limit value upon implementation of the first operating strategy than is the case upon implementation of the second operating strategy. A "higher" rotational speed limit value is understood to mean, in this case, a higher absolute value of the reference speed. In the case of a constant deceleration of the motor vehicle, the downshift therefore takes place at an earlier point in time upon implementation of the first operating strategy than is the case upon implementation of the second operating strategy.

According to one preferred embodiment, a second downshift of the transmission following the downshift is triggered at another rotational speed limit value upon implementation of the first operating strategy than is the case upon implementation of the second operating strategy. For example, the downshift occurring first can be a downshift originating from the third forward gear into the second forward gear, and the second downshift can be a downshift originating from the second forward gear into the first forward gear.

Preferably, the second downshift is carried out at a lower rotational speed limit value upon implementation of the first operating strategy than is the case upon implementation of the second operating strategy. A "lower" rotational speed limit value is understood to mean, in this case, a lower absolute value of the reference speed. In the case of a constant deceleration of the motor vehicle, the second downshift therefore takes place at a later point in time upon implementation of the first operating strategy than is the case upon implementation of the second operating strategy. This can be advantageous, for example, when the starting component can remain engaged or locked up during the second downshift, without adversely affecting the ride comfort.

According to one alternative embodiment, a second downshift following the downshift can be omitted upon implementation of the first operating strategy. If the second operating strategy is implemented, however, the second downshift is carried out. Such an approach is advantageous, in particular, when a starting process subsequent to the stopping process is driven solely by the electric machine.

This is the case because, due to the torque of the electric machine being high already at low speeds, a starting process can frequently also take place in the second forward gear instead of in the first forward gear.

If a starting process subsequent to the stopping process takes place, the starting component is preferably held engaged or locked up upon implementation of the first operating strategy. The starting process therefore initially takes place with the starting component engaged or locked up. As the starting process continues, the starting component can be transferred from the engaged condition into the slip condition, for example, in order to improve the ride comfort during an upshift.

If the drive train includes an internal combustion engine as the second drive source, which can be connected to the input shaft of the transmission by engaging a separating clutch, the second operating strategy is preferably selected during a stopping process with the separating clutch engaged. If the separating clutch is disengaged during a stopping process, however, or if the stopping process takes place with the separating clutch disengaged, the first operating strategy is preferably selected.

In addition to the method according to the invention, a drive train module of a motor vehicle is also provided, which includes at least one drive source designed as an electric machine, an interface to an internal combustion engine of the motor vehicle, a control unit, a transmission for providing different transmission ratios between an input shaft and an output shaft of the transmission, and a starting component in the power flow between the drive source and the output shaft. In this case, the control unit is configured for controlling the above-described method.

BRIEF DESCRIPTION OF THE DRAWINGS

Exemplary embodiments are described in detail in the following with reference to the attached figures. Components that are the same or similar are labeled using the same reference characters. Wherein.

DETAILED DESCRIPTION

Figure 1:
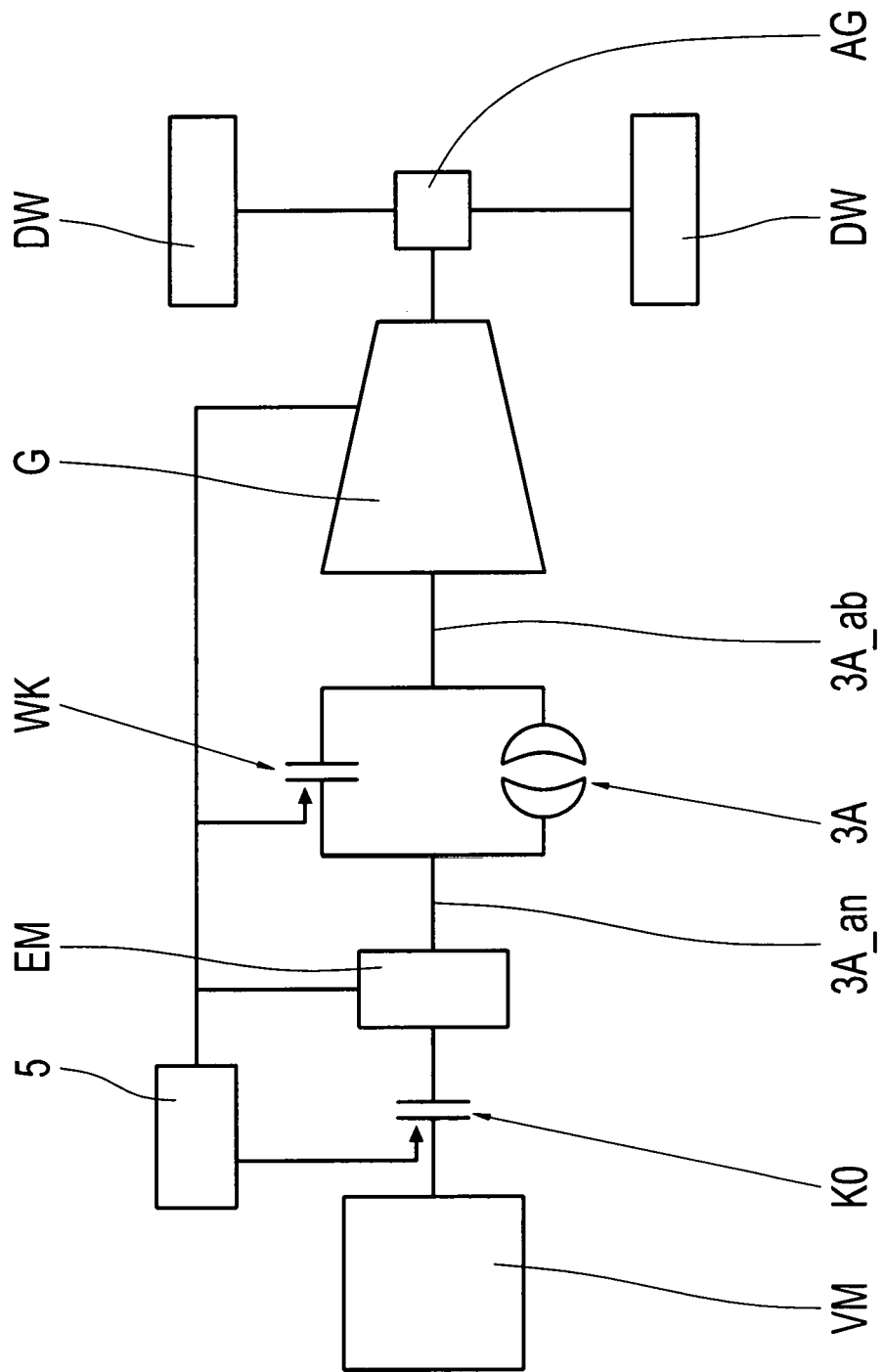
FIG. 1 shows a motor vehicle drive train including a hydrodynamic torque converter as a starting component.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of a drive train of a motor vehicle designed as a parallel hybrid drive train. The drive train includes an internal combustion engine VM and an electric machine EM as drive units. A separating clutch KO is connected between the internal combustion engine VM and the electric machine EM. The drive train from FIG. 1 further includes, as a component, a transmission G for providing various transmission ratios between an input shaft and an output shaft of the transmission G, as well as a starting component 3A which is designed as a hydrodynamic torque converter. The starting component 3A is functionally arranged between the drive units VM, EM and the transmission G.

The starting component 3A can be arranged together with the transmission G, the electric machine EM, and the separating clutch KO in a shared housing. An input side 3A_an and an output side 3A_ab of the starting component 3A can be fixedly connected to each other by engaging a torque converter lockup clutch WK. The transmission G is arranged between the starting component 3A and a differential gear AG, via which the power present at the output shaft of the transmission G is distributed to driving wheels DW of the motor vehicle. Associated with the transmission G is a control unit 5 which has a communication link to the transmission G, the torque converter lockup clutch WK, the electric machine EM, and the separating clutch KO.

Figure 2:
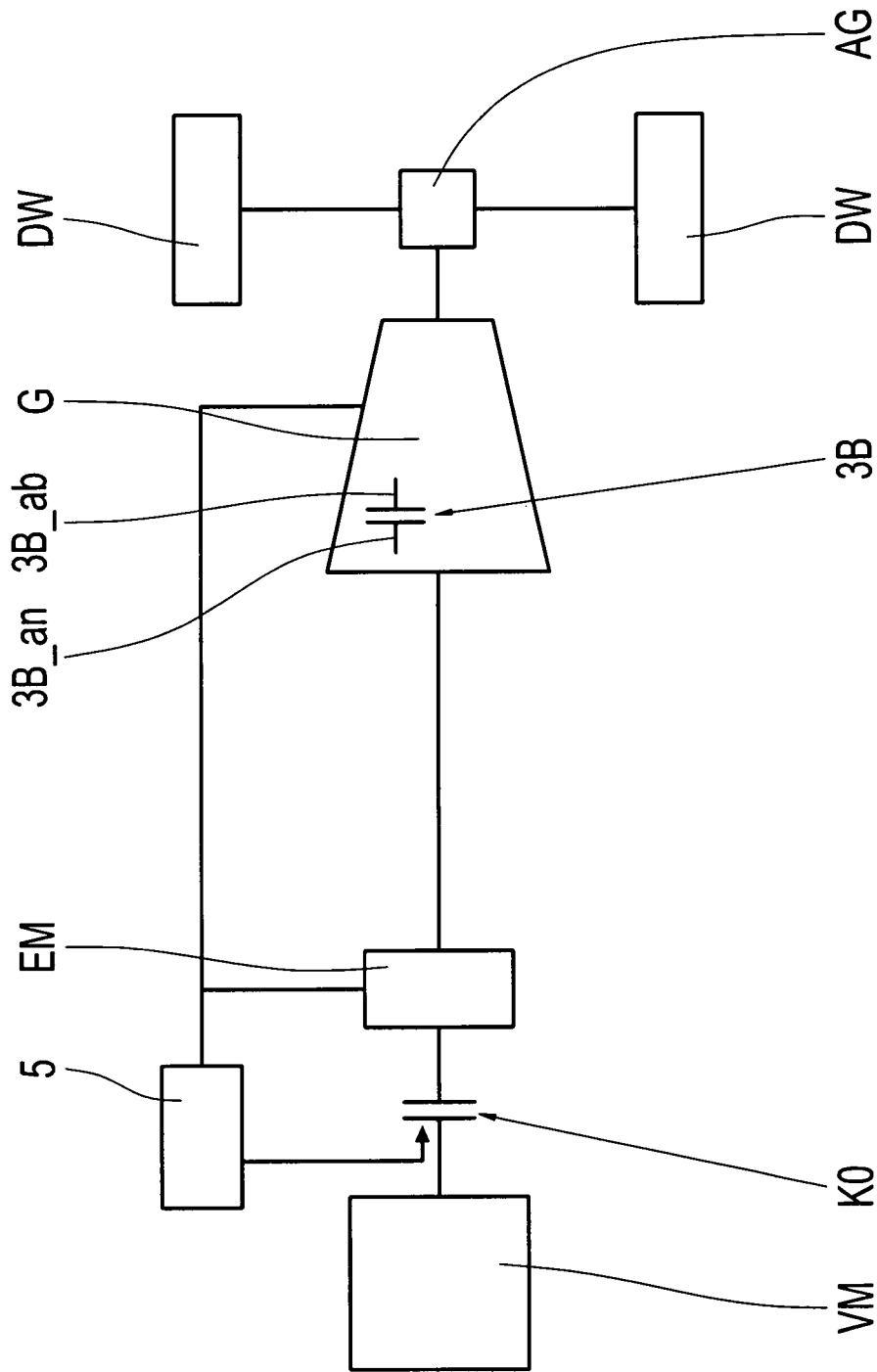
FIG. 2 shows a motor vehicle drive train including a friction clutch as the starting component.

FIG. 2 shows a schematic of a drive train of a motor vehicle designed as a parallel hybrid drive train, which essentially corresponds to the drive train represented in FIG. 1. Instead of the starting component 3A designed as a torque converter 3A, a friction clutch 3B is now provided within the transmission G, as the starting component; the torque converter lockup clutch WK is omitted. The friction clutch 3B has an input side 3B_an and an output side 3B_ab. According to one alternative embodiment which is not represented, the friction clutch 3B could be arranged between the electric machine EM and the transmission G. The control unit 5 has a communication link to the transmission G, the electric machine EM, and the separating clutch KO, and is also configured for controlling the friction clutch 3B.

If a motor vehicle including a drive train according to FIG. 1 or FIG. 2 is to be stopped, the control unit 5 will select between a first and a second operating strategy for controlling the starting component 3B and/or the torque converter lockup clutch WK. In the first operating strategy, the starting component 3A, 3B is engaged or locked up if such a condition is not already present. In the second operating strategy, the starting component 3B is disengaged before the motor vehicle has come to a standstill, or the torque converter lockup clutch WK of the starting component 3A is disengaged. A downshift taking place in the transmission G during the stopping process is triggered, upon selection of the first operating strategy, at another, preferably higher rotational speed limit value than is the case upon selection of the second operating strategy. A subsequent second downshift taking place in the transmission G during the stopping process is triggered, upon selection of the first operating strategy, either not at all or at another, preferably lower, rotational speed limit value than is the case upon selection of the second operating strategy.

Modifications and variations can be made to the embodiments illustrated or described herein without departing from the scope and spirit of the invention as set forth in the appended claims.

REFERENCE CHARACTERS

G transmission
VM internal combustion engine
EM electric machine
KO separating clutch
AG differential gear
DW drive wheel
3A starting component
WK torque converter lockup clutch
3A_an input side
3A_ab output side 3B starting component
3B_an input side
3B_ab output side
5 control unit

The invention claimed is:

1. A method for operating a drive train of a motor vehicle, the drive train including at least one drive source (EM), a transmission (G) for providing different gears between an input shaft and an output shaft of the transmission (G), and a starting component (3A, 3B) in a power flow between the drive source (EM) and the output shaft, the drive source (EM) being an electric motor, the method comprising:
selecting between a first operating strategy and a second operating strategy for controlling the starting component (3A, 3B) or a lock-up of the starting component (3A, 3B) during a stopping process of the motor vehicle; and
carrying out a downshift of the transmission (G) during the stopping process after implementing the first operating strategy or the second operating strategy,
wherein, in the first operating strategy, the starting component (3A, 3B) is engaged or locked up, provided the starting component (3A, 3B) is not already engaged or locked up, and remains engaged or locked up at least until the motor vehicle comes to a standstill,
wherein, in the second operating strategy, the starting component (3A, 3B) is disengaged or the lock-up of the starting component (3A, 3B) is released before the motor vehicle come to the standstill, and
wherein the downshift of the transmission (G) is triggered at a different rotational speed limit value upon implementation of the first operating strategy than upon implementation of the second operating strategy.

2. The method of claim 1, wherein the downshift is carried out at a higher rotational speed limit value upon implementation of the first operating strategy than upon implementation of the second operating strategy.

3. The method of claim 1, wherein the downshift is a first downshift, the method further comprising carrying out a second downshift of the transmission (G) following the first downshift, the second downshift triggered at another rotational speed limit value upon implementation of the first operating strategy than upon implementation of the second operating strategy.

4. The method of claim 3, wherein the second downshift is carried out at a lower rotational speed limit value upon implementation of the first operating strategy than upon implementation of the second operating strategy.

5. The method of claim 1, wherein the downshift is a first downshift, and a second downshift following the first downshift is omitted upon implementation of the first operating strategy and is carried out upon implementation of the second operating strategy.

6. The method of claim 5, wherein, after implementing the first operating strategy during the stopping process, the starting component (3A, 3B) remains engaged or locked up during a starting process following the standstill of the motor vehicle, the motor vehicle accelerated by the drive source (EM) during the starting process.

7. The method of claim 1, wherein the starting component (3A) is a hydrodynamic torque converter which is lockable by engaging a torque converter lockup clutch (WK).

8. The method of claim 1, wherein the starting component (3B) is a friction clutch.

9. The method of claim 1, wherein:
the drive train further includes a second drive source (VM) which is connectable to the input shaft of the transmission (G) by engaging a separating clutch (KO);
the second drive source (VM) is an internal combustion engine;
when the separating clutch (KO) is engaged during the stopping process, the second operating strategy is selected; and
when the separating clutch (KO) is disengaged during the stopping process, the first operating strategy is selected.

10. A drive train module of a motor vehicle, comprising:
at least one drive source (EM) that is an electric motor;
an interface to an internal combustion engine (VM) of the motor vehicle;
a control unit (5);
a transmission (G) for providing different transmission ratios between an input shaft and an output shaft of the transmission (G); and
a starting component (3A, 3B) in a power flow between the drive source (EM) and the output shaft,
wherein the control unit (5) is configured for the method of claim 1.

* * * * *